US011176499B2

(12) United States Patent
Baughman et al.

(10) Patent No.: US 11,176,499 B2
(45) Date of Patent: Nov. 16, 2021

(54) PREDICTING OUTCOMES FROM MEASURES OF GROUP COOPERATION WITH APPLICATIONS IN TRAFFIC ALERT AND CONTROL (71) Applicant: International Business Machines Corporation, Armonk, NY (US)

(72) Inventors: Aaron K. Baughman, Silver Spring, MD (US); Brian P. Gaucher, Brookfield, CT (US); James R. Kozloski, New Fairfield, CT (US); Clifford A. Pickover, Yorktown Heights, NY (US); Valentina Salapura, Chappaqua, NY (US); Alan M. Webb, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 891 days.

(21) Appl. No.: 14/948,285

(22) Filed: Nov. 21, 2015

(65) Prior Publication Data
US 2016/0321599 A1 Nov. 3, 2016

Related U.S. Application Data (63) Continuation of application No. 14/700,823, filed on Apr. 30, 2015, now abandoned.

(51) Int. Cl.
*G06Q 10/06* (2012.01)
*G06Q 10/10* (2012.01)
(52) U.S. Cl.
CPC ............ *G06Q 10/063114* (2013.01); *G06Q 10/06375* (2013.01); *G06Q 10/063116* (2013.01); *G06Q 10/1095* (2013.01)

(58) Field of Classification Search
None
See application file for complete search history.

(56) References Cited

U.S. PATENT DOCUMENTS 8,458,105 B2 * 6/2013 Nolan ................. G06F 16/358
706/13
8,484,040 B2 7/2013 Ashour
(Continued)

FOREIGN PATENT DOCUMENTS

EP 0493822 A1 7/1992
JP 2012155769 A * 8/2012
(Continued)

OTHER PUBLICATIONS

NPL reference: Newcomb, Doug. New Technology May Prevent Accidents By Reading Drivers' Body Language. Forbes.com. Apr. 22, 2015. https://www.forbes.com/sites/dougnewcomb/2015/04/22/new-technology-looks-inward-to-prevents-accidents-by-reading-drivers-body-language/ (Year: 2015).*
(Continued)

*Primary Examiner* — Patricia H Munson
*Assistant Examiner* — Nancy N Prasad
(74) *Attorney, Agent, or Firm* — Anthony Curro; Otterstedt, Wallace & Kammer, LLP (57) ABSTRACT Data is obtained specifying a measure of a data set to be analyzed by human experts and allotted time for analysis completion. Based on same, a schedule is created for a primary meeting of human experts, whose aim is to analyze the data. The meeting is evaluated to create rate estimates for hypothetical meeting partitions; and, if the primary meeting is not adhering to schedule and/or can be speeded up, the meeting partitions are simulated until a partitioning scheme is determined that can restore the meeting to schedule and/or speed it up. In another aspect, a model of focus of attention of each member of a group of individuals engaged in an
(Continued)

activity requiring cooperation is dynamically updated, and a cooperation index is determined based on the model of focus of attention, an interaction graph, and at least one physiological parameter of at least one of the members.

4 Claims, 5 Drawing Sheets

(56) References Cited

U.S. PATENT DOCUMENTS

| | | | |
|---|---|---|---|
| 2003/0069683 A1* | 4/2003 | Lapidot | G08G 1/096872 701/117 |
| 2004/0147291 A1* | 7/2004 | Zhang | G08G 1/123 455/569.2 |
| 2010/0302346 A1 | 12/2010 | Huang et al. | |
| 2010/0325214 A1 | 12/2010 | Gupta | |
| 2011/0072362 A1* | 3/2011 | Denner | G06Q 10/109 715/751 |
| 2012/0316845 A1* | 12/2012 | Grey | G06Q 10/06398 703/2 |
| 2013/0144679 A1 | 6/2013 | Burnett et al. | |
| 2013/0336317 A1 | 12/2013 | Mithyantha et al. | |
| 2014/0113619 A1* | 4/2014 | Tibbitts | H04W 48/04 455/419 |
| 2014/0309849 A1* | 10/2014 | Ricci | G01C 21/26 701/33.4 |
| 2015/0254955 A1* | 9/2015 | Fields | G08B 21/02 705/4 |
| 2016/0191580 A1 | 6/2016 | Goepp et al. | |
| 2016/0247122 A1 | 8/2016 | Wong et al. | |

FOREIGN PATENT DOCUMENTS

| | | |
|---|---|---|
| WO | WO2011139139 A8 | 2/2012 |
| WO | WO2012107636 A1 | 8/2012 |

OTHER PUBLICATIONS

Puurtinen et al, Between-group competition and human cooperation. Proceedings Of The Royal Society, Sep. 30, 2008, p. 355-360, Finland.

Hexoskin wearable body metrics, Downloaded from http://www.hexoskin.com/ on Apr. 28, 2015, pp. 1-4.

James R Kozloski, unpublished U.S. Appl. No. 14/584,365, filed Dec. 29, 2014, Enumeration and Modification of Cognitive Interface Elements in an Ambient Computing Environment.

Aaron K. Baughman et al., unpublished U.S. Appl. No. 14/700,823, filed Apr. 30, 2015 Predicting Outcomes From Measures of Group Cooperation With Applications in Traffic Alert and Control, pp. 1-38 plus 5 sheets drawings.

List of IBM Patents or Applications Treated as Related.

* cited by examiner

| CloudIndex | CognitiveIndex | Expertise | Target | Experience |
|---|---|---|---|---|
| 4.00 | 7.00 | Infrastructure | Cognitive | Low |
| 5.00 | 8.00 | Haptic Interfaces | Cognitive | High |
| 10.00 | 4.00 | Contextual Computing | Cognitive | High |
| 11.00 | 12.00 | Infrastructure | Cognitive | High |
| 3.00 | 45.00 | Machine Learning | Cognitive | Low |
| 5.00 | 2.00 | Pattern Recognition | Cognitive | High |
| 4.00 | 3.00 | Haptic Interfaces | Cognitive | High |
| 3.00 | 4.00 | Pattern Recognition | Cognitive | Low |
| 2.00 | 5.00 | Infrastructure | Cognitive | High |
| 67.00 | 6.00 | Machine Learning | Cognitive | High |
| 5.00 | 2.00 | Contextual Computing | Cognitive | Low |
| 4.00 | 8.00 | Pattern Recognition | Cognitive | High |
| 3.00 | 5.00 | Infrastructure | Cognitive | Low |
| 25.00 | 9.00 | Infrastructure | Cognitive | High |
| 12.00 | 3.00 | Hardware | Cognitive | High |
| 6.00 | 5.00 | Machine Learning | Cognitive | High |
| 8.00 | 7.00 | Middleware | Cloud | Low |
| 12.00 | 2.00 | Infrastructure | Cloud | High |
| 17.00 | 7.00 | Contextual Computing | Cloud | Low |
| 28.00 | 3.00 | Forecasting | Cloud | Low |
| 39.00 | 6.00 | Middleware | Cloud | High |

PREDICTING OUTCOMES FROM MEASURES OF GROUP COOPERATION WITH APPLICATIONS IN TRAFFIC ALERT AND CONTROL

CROSS-REFERENCE TO RELATED APPLICATION

This application is a continuation of U.S. patent application Ser. No. 14/700,823 filed Apr. 30, 2015, the complete disclosure of which is expressly incorporated herein by reference in its entirety for all purposes.

FIELD OF THE INVENTION

The present invention relates to the electrical, electronic, and computer arts, and, more particularly, to cognitive and contextual computing, and the like.

BACKGROUND OF THE INVENTION

Cooperation within a group is predictive of outcomes of group activities, such as the results produced by a meeting. This measure of group cooperation depends on many inputs from meeting participants, including focus of attention and the communication graph between participants. Often a meeting's objectives within an enterprise will center on the analysis of a large data set in order to make a decision. These data sets may be novel, or the amount of time necessary to fully analyze the data may be uncertain given the data complexity and meeting character.

SUMMARY OF THE INVENTION

Principles of the invention provide techniques for predicting outcomes from measures of group cooperation with applications in traffic alert and control. In one aspect, an exemplary method includes the step of obtaining data specifying: a measure of a data set to be analyzed by human experts; and an allotted time for analysis completion. Further steps include: based on the measure of the data set and the allotted time, creating an analysis completion schedule for a primary meeting of the human experts, whose aim is to analyze the data set; determining whether the primary meeting is adhering to the analysis completion schedule and/or can be speeded up; evaluating the primary meeting to create rate estimates for hypothetical meeting partitions; and, responsive to the determining indicating that the primary meeting is not adhering to the analysis completion schedule and/or can be speeded up, simulating the meeting partitions until a partitioning scheme is determined that can restore the meeting to the completion schedule and/or speed up the primary meeting.

In another aspect, another exemplary method includes the steps of dynamically updating a model of focus of attention of each member of a group of individuals engaged in an activity requiring cooperation; generating an interaction graph showing, over time, which members have interacted and over what linkages the interactions have occurred; measuring at least one physiological parameter associated with at least one of the members; determining a cooperation index based on the model of focus of attention, the interaction graph, and the at least one physiological parameter of the at least one of the members; comparing the determined value of total cooperation index to historical data to predict a given outcome for the group of individuals engaged in the activity; and if the predicted group outcome has significant negative consequences, alerting the group of individuals engaged in the activity requiring cooperation that the cooperation must improve to reduce likelihood of the predicted group outcome with the significant negative consequences.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects; for example:

- the ability to organize teams and meeting schedules around specific targets, requiring data analytics (and relevant expertise) and decision making based on support (and relevant expertise);
- the ability to measure progress towards completion and partition the work to maximize likelihood of satisfying a schedule;
- a technique to target particular outcomes and thereby construct analyses and their artifacts that support each outcome;
- a technique to organize traffic towards a particular outcome.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

In one aspect, one or more embodiments provide a method for continually updating a projected measure of the quantity of data from a target data set that a meeting will successfully analyze. Based on this projection, a meeting may be parallelized, either by partitioning it into smaller groups, or by enlisting the help of other meetings, to finish the analysis of data in an allotted amount of time.

Often, a meeting's objectives within an enterprise will center on the analysis of a large data set in order to make a decision. These data sets may be novel, or the amount of time necessary to fully analyze the data may be uncertain given the data complexity and meeting character. Currently, there is no technique for an enterprise to automatically determine when a data set should be analyzed in parallel by multiple meetings based on a dynamically updated estimate of the quantity of data an ongoing meeting will analyze during the time allotted.

In one or more embodiments, an ongoing meeting whose aim is to analyze a data set is continually evaluated in order to project a measure of the quantity of data that will be effectively evaluated in an allotted amount of time. Based on this evaluation and projection, a meeting may be subdivided and data partitioned into separate parallel meetings for analysis. In addition, a dataset may be partitioned and distributed to other meetings (ongoing or newly called) to accomplish the analysis in the allotted time.

Unlike current techniques, one or more embodiments make use of an automatic meeting partitioner to maintain adherence to a meeting's data analysis schedule. Furthermore, while parallel computing is known in the art, unlike current techniques, one or more embodiments provide a parallelization method for human computing, wherein, data partitioning is mapped to a human-computer dyad in order to minimize cost while maintaining adherence to an analysis schedule.

Figure 3:
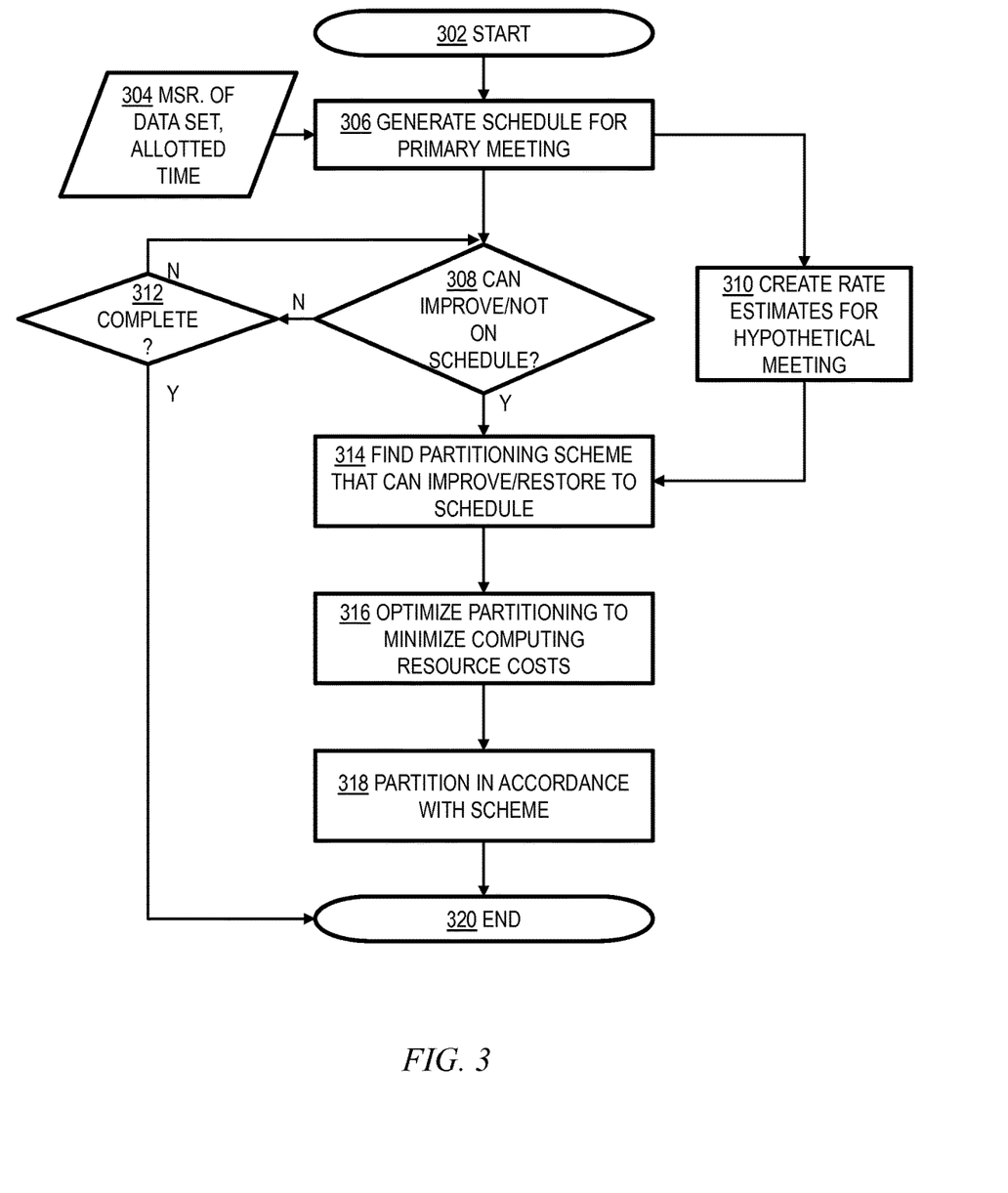
FIG. 3 shows a flow chart of a first method, in accordance with an aspect of the invention.

Advantageously, one or more embodiments implement the following four steps—reference should be had to the flow chart of FIG. 3, which begins at 302:
1. As in step 306, automatically generate a data analysis schedule for a meeting based on a data analysis need and an allotted time (data 304), and, as in step 308, continually evaluate a meeting's adherence to the analysis schedule (and/or whether the timeliness could be significantly improved, even if already on schedule).
2. As in step 310, automatically simulate meeting partitioning scenarios based on individual cognitive roles and make-ups within a meeting in order to estimate a new data analysis rate for the partitioned meeting. In a non-limiting example, a further gradation or granularity of the partitioning includes breaking the individual cognitive roles into "analytics expertise" and "integration/decision making based on support." The simulated partitioning is then carried out based on those cognitive roles, and the actual partitioning of the meeting is in accordance with those cognitive roles.
3. Assuming deviation from the schedule (and/or possibility of significant improvement, even if on schedule) (Y branch of decision block 308), in step 314, based on simulated partitionings, automatically determine when and how a meeting should be partitioned in order to maintain adherence to the data analysis schedule and/or to significantly improve the timeliness.
4. As in step 316, optionally optimize a meeting partitioning to minimize costs of compute resources for a given analysis.

Note that when a meeting remains on schedule (N branch of block 308), a determination can be made whether the meeting is complete, as in decision block 312; if so, as per the Y branch of block 312, proceed to the end, at 320; if not, as per the N branch of block 312, continue to check for adherence to the schedule and/or possibility of significant improvement, even if on schedule.

In step 318, the meeting can be partitioned in accordance with the calculations.

The logical flow ends at 320.

Consider that in this complex and data-driven world, data may represent various important fields and considerations. For example, data may involve financial planning, budget data, sales data, stock trading, experimental results, analysis of customer surveys, ratings of TV shows, product reviews, and the like. Data may relate to disaster recovery, security, risk analysis, etc. In some cases, the data analysis will involve human experts, who respond with a clear and logical motivation and/or with a "gut" instinct, which can often have powerful and useful repercussions. Alternatively, or additionally, data analysis may be done with software running on computing devices. Of course, one challenge may relate to which experts or colleagues to use in a parallel meeting for the purpose of discussions of data or analyses of data. Similarly, it can be challenging to automatically know which software and computing infrastructures are available. In one or more embodiments, the determination of people and computing aids is automated.

As a meeting is monitored with respect to progress, it may be determined, for example, that achieving a goal is possible but it is not likely to be achieved in a predetermined desired amount of time. Of course, additional computing resources may be enlisted. However, it may be that extra human insight and expertise are required. Then, the system may simulate meeting partitions (involving various possible experts who are available for a meeting, based on their calendars, and who have a certain history of "performing a kind of analysis," "closing a deal," "finishing a task," "providing useful information," providing a "get it done" attitude, etc.). Based on a partitioning, a rate of completion for different analysis tasks may be estimated, and then summed based on order dependencies. For example, a team of analysts may have an estimated completion time of 3 months for performing a deep neural network categorization study on a particular data set. With additional compute resources added to this partition, it may require 2 months. A different partition may begin to simultaneously relate the analyses generated to a decision point or outcome target starting at 1 month after analysis begins. The estimated completion time of the second partition may similarly require 3 months. The total estimated time to task completion for this partitioning is then 4 months. Different partitions may similarly be generated, and different dependencies and estimates compared. This simulation may then be performed until a partitioning scheme S is determined that can restore the meeting to the completion schedule. Also note that human analysts may become tired, need a different perspective, may be unable to study a massive analysis, etc. Based on this insight, this simulation may also be performed until a partitioning scheme S is determined that can restore the meeting to the completion schedule.

Automated use of social networks, along with cognitive assessment of working styles, may be used to aid the system in traversing a social network for the recruitment of individuals and/or their machines or software tools and/or expertise with software tools.

Consider a case where a team is trying to understand 5 TB of data that represent text analytics, social network analysis, etc. The team is asked to make a decision based on such information. However, the team is overwhelmed with the data or is becoming tired. The information may be raw numerical data, but may also be processed data (especially, for example, in the stream associated with analysis integration and decision formulation) in the form of animations, graphics, and the like. In such cases, it would be useful if another team receives some of the information to study, and if the two teams regroup as a larger team to talk it over.

One or more embodiments are useful in analyzing data related to national security concerns or in analyzing data related to product or service failure. To aid in the process outlined in Steps 1-4 above, the system can automatically organize data into themes. The various automatically identified themes can be used as additional input that may relate to the simulated partitionings (see Step 3 above) and actual partitioning. Thus, in one aspect, an exemplary method further includes retrieving electronic data from at least one data source; storing the data in a temporary storage medium; querying the data from the temporary storage medium using a computer-based query language; creating and identifying themes automatically within the data using a computer program including a statistical probability based algorithm; organizing the data into the identified themes based on the content of the data; and, identifying and predicting the probability of at least one future event (such as an event with national security implications or a product or service failure).

The partitioning algorithm may take into consideration various security concerns. For example, some groups of people may be able to be exposed to certain information, while others cannot be exposed to such information.

Note also that the system may make use of related-art methods and systems for social analysis in multi-participant meetings. These methods provide for receiving a data stream of a multi-participant meeting, wherein multiple topics are discussed. The data stream is analyzed to detect topics and to define topical sub-activities that are performed by at least a portion of the participants. Contributions to a topic by two of the participants in the topical sub-activities are identified and evaluated. A connection weight between the two participants is calculated based on the evaluation of their respective contributions. These weights may then be used to aid in the partitioning procedure in Step 3 and 4 above.

One or more embodiments provide a method for automatically creating a data analysis schedule and updating a schedule adherence measure for a meeting, based on available compute resources and meeting participants, and an enterprise's need for a decision in an allotted time. In some cases, new partitionings of the meeting are simulated based on measures of models of individual meeting participants, to estimate data analysis rates for parallel partitions. In some such cases, a new partitioning is suggested when a meeting has departed from its analysis schedule; optionally, a cost of compute resources needed is further optimized by the partitioner.

Thus, one or more embodiments take as input: a measure of a data set (e.g., number of bytes, number of columns, number of derived decision points, etc.); and an allotted time, in order to create an analysis completion schedule for a meeting whose aim is to analyze the data. One or more embodiments monitor the ongoing meeting for adherence to the completion schedule, and evaluate the meeting to create rate estimates for hypothetical meeting partitions. When the meeting's adherence to a completion schedule falls below a threshold, one or more embodiments simulate meeting partitions until a partitioning scheme S is determined that can restore the meeting to the completion schedule. The meeting is then partitioned according to S. Optionally, when one or more computer resources are the limiting step, include in the partitioning scheme S a dynamic partitioning of the data between meeting partitions, and additional computer resources. Optimize the meeting partitioning to minimize the cost in computer resources required.

Figure 1:
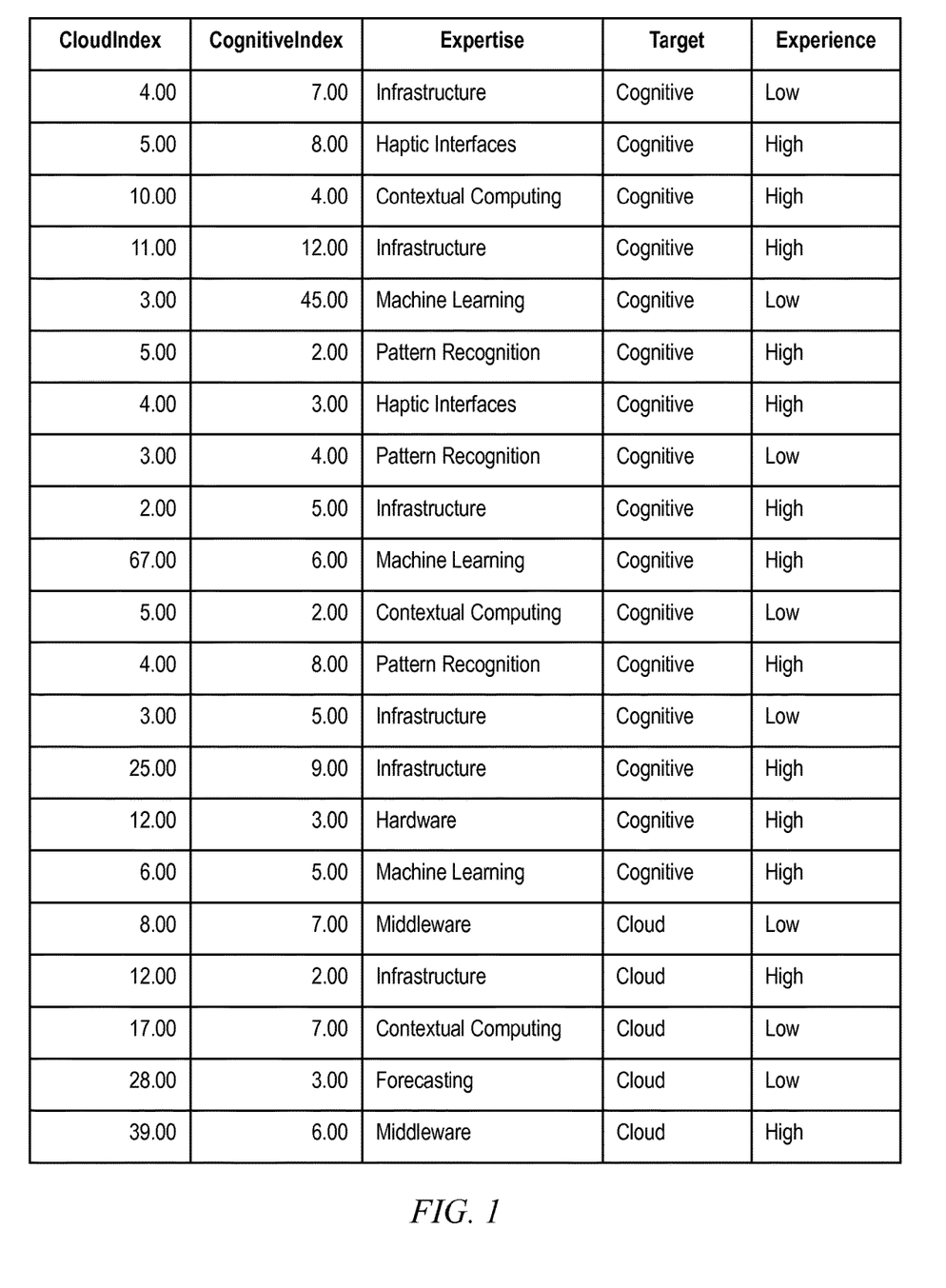
FIG. 1 depicts exemplary data generated from one meeting from all participants.
Figure 2:
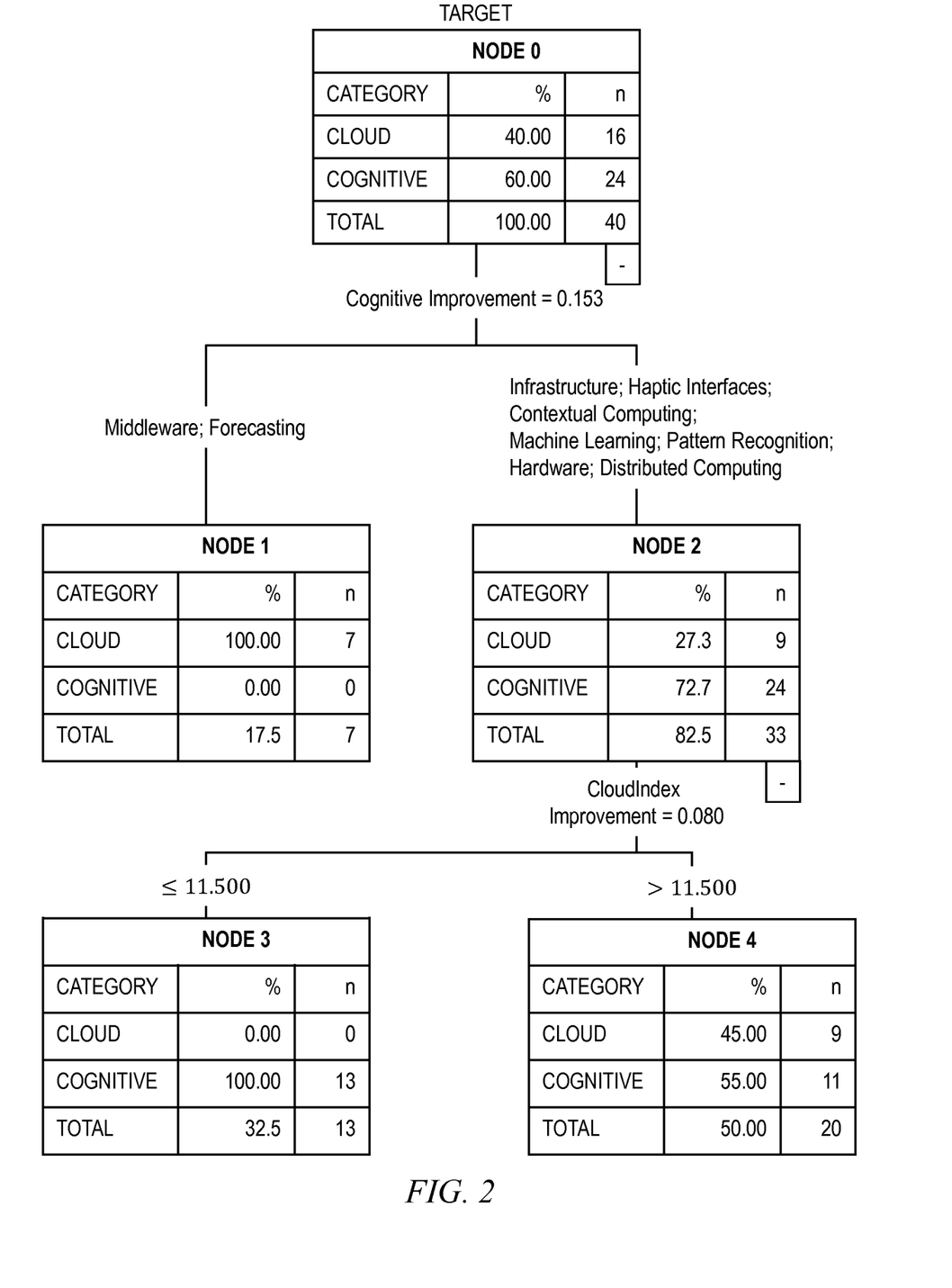
FIG. 2 shows a decision tree method that scheduled five total meetings, where each node is a meeting.

FIGS. 1 and 2 present an example of subdividing groups towards two target decision points: whether Cognitive Technology or Cloud should first be introduced into a market offering. FIG. 1 presents example data generated from one meeting from all participants. The target variable or dependent variables have labels "Cognitive" or "Cloud." The target provides the ground truth that each person should provide as an answer after the end of the meetings. The example dependent variables are:

CloudIndex=the relevancy or term frequency-inverse document frequency (TF-IDF) scores of a conversation to "Cloud" by an individual contrasted to the group for this meeting CognitiveIndex=the relevancy or TF-IDF scores of a conversation to "Cognitive Technology" by an individual contrasted to the group Expertise=Nominal data for areas of expertise for each individual Experience=Binary high (more than ten years) or low (less than ten years) experience level. (Note that there can be finer gradations in other embodiments—indeed, any categorization is possible. However, the complexity of the simulation and partitioning problem grows with more categories.)

In FIG. 1, "target" is the target outcome for the individual's decision. By establishing a target, an individual is asked to perform analyses in such a way to test the hypothesis that the target answer is correct. If the individual, after performing analysis, integration, and decision tasks, reaches a conclusion about what decision is advisable, the system may also note this outcome as a dependent variable, where the dependent variable depends on all other columns in the table, as well as the hypothesis or target the individual was asked to test. Note that formulating the process in this way allows certain analyses to be chosen to best test the hypothesis that the decision is best. These analyses may not be indicative or designed to test if the alternative decision is best. In this way, the system may provide guidance when none of the targeted alternatives are advisable.

Other domain dependent features can be extracted in a meeting, such as cloud and cognitive language model measures. The domain dependent features should be scored with the data that is analyzed during the meeting. Further, additional domain independent features such as geographical, recent training profile, and date of hire, etc. can be extracted from each individual.

In FIG. 1, each row is a member of a large meeting. The entire row is a feature vector with a target value this member is testing. Thus, in the first row, the individual during the meeting in question had a CloudIndex of 4.00 and a CognitiveIndex of 7.00, expertise in the field of infrastructure, and a low experience level. Furthermore, this individual's target test was "cognitive" during this meeting.

As the initial meeting begins, participants are placed into one large meeting to discuss which service offering to introduce first. One or more corpora of data are presented to the group, on which to base a decision. After the meeting, each individual makes a decision. The algorithm then schedules additional meetings with subgroups based on answers and target values. FIG. 2 shows an exemplary decision tree method that scheduled five total meetings where each node (Node 0 through Node 4) is a meeting. The goal was to produce meetings where individuals were grouped together and scored. The context dependent scores are generated based upon the one or more corpora of data that are to be analyzed.

To encode a volume of data that should be analyzed in a meeting, the target variable will be the assignment of the volume of data each member should analyze. In this way, the decision tree will schedule meetings that enable the attainment of the desired volume per each individual.

If time is the desired metric, then the rate of data analysis and accuracy of analysis become independent variables while rate is the target. The tree is dynamically updated to create new meetings so the target variables are attained.

As meetings progress, additional features are extracted about individual outcomes and decisions at each level in the tree. The tree nodes are further stratified with additional data, such that groups are formed to finalize their target assessments, and determine which analyses have built, for example, consensus in one partition or another towards their respective targets. Consensus is not guaranteed, but is observed for certain nodes, which constitute leaf nodes in the tree.

With particular reference to FIG. 2, an initial meeting, represented by Node 0, analyzes a data set towards certain targets for each meeting member. The initial meeting is broken up into two sub-meetings, corresponding to Nodes 1 and 2. The notation "Cognitive Improvement=0.153" indicates an increase in support for Cognitive target among members testing this target. The meeting represented by Node 1 includes n=7 participants, all experts in middleware or forecasting, while the meeting represented by Node 2 includes n=33 participants, 9 in the cloud field and 24 in the cognitive field, with expertise in infrastructure, haptic interfaces, contextual computing, machine learning, pattern recognition, hardware, and distributed computing. The total percentages of Node 1 and Node 2 add up to 100, and the total values of n of Node 1 and Node 2 add up to 40, indicating that Nodes 1 and 2 were spawned from Node 0.

Note generally that in FIG. 2, percentages refer to the percentage of meeting members decision at this node, and n refers to number in each category, such that:

% Cloud=100*$n\_cloud/n\_total$.

The meeting corresponding to Node 2 is broken up into two further sub-meetings, corresponding to Nodes 3 and 4. The notation "Cloud Index Improvement=0.080" indicates the increase in support for Cloud target among members testing this target. The notation "≤11.500 and >11.500" refers to a partitioning scheme for the next meeting based on a measure of confidence in "Cognitive" target after Node 2 meeting. The meeting represented by Node 3 includes n=13 participants, while the meeting represented by Node 4 includes n=20 participants. The significance of Cloud and Cognitive percentages is similar to that explained above, as are values of n. The total percentages of Node 3 and Node 4 add up to 82.5, and the total values of n of Node 3 and Node 4 add up to 33, indicating that Nodes 3 and 4 were spawned from Node 2.

In another aspect, an exemplary method is provided for applying a system for automatically measuring group cooperation for predicting group outcomes in a meeting and in a traffic alert (traffic is intended in the broad sense of ground, water or air based transportation systems) and a control system for partitioning the group. By iterative partitioning as above, the consensus in behavioral categories among a group can build safety within the group, since understanding the intentions of others is central to successful navigation in groups of transportation vehicles. Specifically, a group of vehicles' heading, drivers' and/or pilots' focus of attention, vehicle-to-vehicle interaction graph topology, and physiological measures of drivers (such as facial expression, skin conductance on steering wheel, and in-car vocalizations), are all used to characterize vehicle-to-vehicle cooperation. When cooperation falls below a threshold, an automatic signal is triggered to drivers, pilots, and to in-room and on-board vehicle systems, that an accident is imminent.

Cooperation within a group is predictive of outcomes of group activities, such as the results produced by a meeting in a cognitive enterprise lab meeting room. This measure of group cooperation depends on many inputs from meeting participants, including focus of attention, the communication graph between participants, and physiological measures of the meeting attendees. Such measures may be used to adjust a meeting agenda, refocus its members' activities, etc. in order to improve expected outcomes. Advantageously, unlike prior techniques, one or more embodiments transfer these capabilities to other settings where measures of cooperation have high predictive value, and where modifications to activities may be life-saving, such as in ground, water or air based traffic alert and control systems where cooperation between cars, planes, and/or ships is predictive of accidents.

One or more embodiments take inputs in an instrumented meeting room or from a set of vehicles on a road, waterway, or in the air, and transform them into a total cooperation index (CI). Based on historical data, CI is then used to predict certain outcomes of the group, such as meeting effectiveness, likelihood of meeting goals within an allotted time, or an accident on a highway. The outcomes prediction is communicated to meeting participants, encouraging greater cooperation, until CI returns to an acceptable range. The communications pathways can be single or multiple and may include such technologies as wired (e.g. Ethernet, TCP/IP, RS-232, and the like), wireless (e.g. WiFi, Bluetooth, Ultra-wideband (UWB), Cellular, millimeter wave (mmWave), Adaptive Cruise Control, Infrared, Laser, Radar, video, LED, lighting, and the like), audio (in vehicle radios, alert systems, and the like), Tactile (e.g. vibration, electrical, and the like), and so on.

Figure 4:
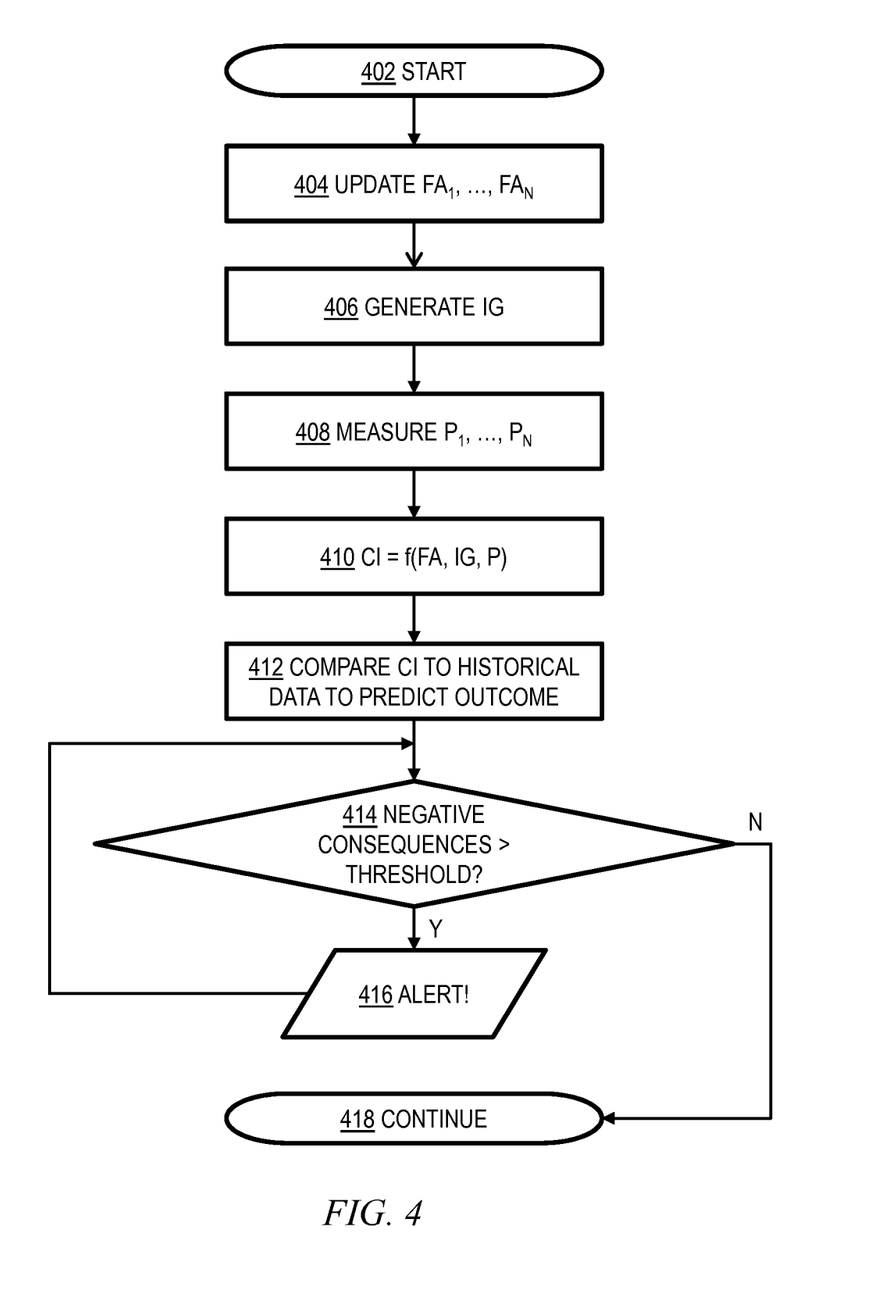
FIG. 4 shows a flow chart of a second method, in accordance with another aspect of the invention.

Referring now to the flow chart of FIG. 4, which begins at 402, in one or more embodiments, as per step 404, dynamically update a model of focus of attention of each member (N total) of a group or each driver or pilot in a traffic environment (FA). The skilled artisan will be familiar with video analysis of individuals to determine direction of gaze. In another aspect, consider co-assigned unpublished U.S. patent application Ser. No. 14/584,365 filed Dec. 29, 2014, first named inventor James R. Kozloski, entitled ENUMERATION AND MODIFICATION OF COGNITIVE INTERFACE ELEMENTS IN AN AMBIENT COMPUTING ENVIRONMENT, which is expressly incorporated herein by reference in its entirety for all purposes. Consider specifically the coupling of electronic devices, in an environment, such as an automobile, in order to represent a model of human interaction with those devices over time. One can infer that interaction requires a focus of attention, and therefore the model becomes one of changes in focus of attention over time; e.g., a cell phone with a Bluetooth coupling to an automobile to control what music is to be played, as well as whether the individual is texting, activating a turn signal, etc., to the benefit of a model of individual focus of attention residing on the phone and/or automobile. In order to model focus of attention, a communicative coupling is provided between the user interfaces of the electronic devices such that sequential interaction can be noted in a single, central model, which can be located as desired.

In step 406, generate a member/vehicle interaction graph representing, over time, which vehicles and over which linkages interactions have occurred (IG). Interaction has a definition which derives from focus of attention but can also be augmented. Looking at another vehicle is an interaction. There is also interaction that is supported by interfaces well-known in the art, wherein vehicles communicate with each other to estimate distance, perform handshaking during automatic driving, employ LIDAR or similar safety equipment, etc. Interactions can be measured by a variety of well-known means. Construction of an interaction graph can then be undertaken, given the teachings herein, by constructing nodes representing vehicles or other entities that will interact, and, as interactions are detected, adding edges between nodes that have interacted. The resulting graph can then be analyzed via network analysis, graph analysis, or the like.

In step 408, measure physiological parameters of group members and drivers, including pupil dilation, skin conductance, and vocalization rate (P), for each of the N members, drivers, pilots, etc. In known techniques of pupil tracking, the image analysis determines the shape of the pupil from the direction of the camera; the pupil changes apparent shape based on the relative positioning of the eye and camera (e.g., circular when straight on, oval when viewed from an angle). Pupil diameter to estimate dilation can also be measured during this process. Vocalization rate can be determined from well-known sound analysis techniques (e.g., words per minute based on speech-to-text). Skin conductance is known from various user interface techniques—e.g. computer mice; wearables such as Hexoskin wearable body metrics, available from Hexoskin, Montreal, Quebec, Canada, a shirt which can measure skin conductance, heart rate, respiration rate, total respiration, total acceleration of the body; and so on. Many of these parameters can also be measured with bracelet-type devices as well.

In step 410, based on a function of these inputs, compute CI=f(FA, IG, P). In some instances, a semi-supervised learning approach is employed to estimate or even optimize the function CI. For example, collect data surrounding FA, IG, and P, employ unsupervised feature extraction techniques (e.g., principal component analysis, independent component analysis, statistical learning) to determine which features are most common in the data space. Typically, a cluster of things will occur together (correlation). For example, when skin conductance goes up, it may be an indication that the driver is in proximity to a large truck and has recently had an interaction with a truck that lasted more than 5 seconds. In order to describe a cooperation index, the features are related to some other type of measure, estimate, or outcome, referred to as cooperation. If an individual has clearly undergone a non-cooperative encounter, whether identified (labeled) by virtue of an accident, self-labeling of data, or some other technique, it is possible to then go back, review the pertinent features, and determine which features are predictive of, and/or correlated with, the label "uncooperative." This leads to the complete function CI: by analyzing the measures, understanding what features they correspond to, and using that to predict the label/index, CI can be learned. In essence, manual labeling can be undertaken on a corpus of data; then, using the labeled corpus for training, real-world data can be analyzed to see if it corresponds to a label such as "uncooperative." In some instances, automated labeling techniques could be used instead of, or in conjunction with, manual labeling, to infer uncooperative intervehicular interactions; e.g., by noting vehicle braking.

In step 412, compare CI to historical data (e.g., a regression of the historical data) in order to predict a given group outcome. That is to say, determine if the calculated value of CI correlates to a potential uncooperative incident. Note that the change in CI is an estimate of the label over time, and can also be useful. Thus, point labels, i.e., instantaneous values of CI are useful, but in some instances, values of CI are computed continuously and changes in CI can also be used to predict outcomes. In essence, this provides a second layer of prediction; first estimate/predict CI and then based on the time course of CI, predict a particular outcome. A similar training process to that described can be used to train for predictions based on changes in CI over time. An exemplary prediction could be that an accident is 75% likely in the next 10 minutes or that a meeting has only a 50% chance of finishing the scheduled data analysis. Thus, both instantaneous values of CI and the time-rate-of-change of CI (first derivative) can have predictive value in one or more embodiments.

In decision block 414, if a predicted group outcome has negative consequences exceeding a threshold (Y branch), alert the group that cooperation must improve, in step 416. Communicate the fact that the threshold has been exceeded over appropriate redundant robust communications (wired, wireless as above) channels using appropriate protocols, over meshed (decentralized) or centralized networks for action i.e. alerts, overrides. The effect is to provide a communication within the vehicle of various drivers as to the outcome of a grouping and their role and participation in it. If no other partitionings are available, outlier drivers should be advised to modify their behavior accordingly. For example, carry out calculations, using software, and if there is a certain degree of probability of trouble, the software dispatches an alert or warning message. In some cases, the certain degree of probability is determined by experience; alternatively, it can be learned using techniques as described above.

Warning may continue until the threshold is no longer exceeded. If decision block 414 yields a "NO," skip or cease the alert step. Logical flow continues at 418.

Note that in one or more embodiments, CI is used to predict the likelihood of an accident (A). If A exceeds a threshold, an automatic warning system (road sign or in car, ship or plane) is activated to alert drivers or pilots that, based on measures of cooperation between cars, ships, or planes, an accident is likely. Warning continues until CI<A. The threshold could relate to CI itself or any time derivative of CI; for example, based on learning.

Advantageously, unlike current solutions, one or more embodiments apply cognitive computing technology and measures of cooperation in a group within a meeting or in a traffic environment, to automatically predict and warn group members or drivers/pilots of an imminent negative consequence of their lack of cooperation, such as a failed meeting or accident. Existing solutions for vehicle warning, for example, are based on individual measures of reckless driving, flying etc., and do not take into account global measures of group cooperativeness.

Advantageously, one or more embodiments:

1. Automatically quantify group dynamics in order to estimate cooperation within a group.

2. Regress cooperation indices against certain outcomes such a failed meeting or a traffic accident.

3. Based on this regression, predict how a current cooperation index might influence a particular group outcome, and automatically alert group members that this outcome is likely.

4. Communicate these outcomes over robust centralized or decentralized communication networks.

Consider that, based on the aforementioned considerations of cooperation, alertness, etc., various actions can be taken. Alerts may be provided over a vehicle audio system (e.g. radio system). The steering wheel may vibrate to get the driver's attention. Traffic signals may change slightly. For example, if a potential accident is predicted with a certain confidence level, the timing of traffic lights may change. A history of "cooperating" among drivers may also be considered when determining the aforementioned confidence level. For example, if ten vehicles are approaching an intersection, with a traffic light about to change color, and three drivers are known for aggressive driving or road rage, two drivers are quite sleepy, one is strongly engaged with the radio controls and talking on a hands-free device to another person, another is a brand-new driver, and one has poor vision or hearing, then the timing of the traffic light may alter slightly. Similarly, related parameters may be considered, such as: drivers' focus of attention and physiological measures of drivers (such as facial expression, skin conductance on steering wheel, and in-car vocalizations). Other cognitive determinants include: a measure of emotion between the driver and someone on the phone, the driver's use of a smart glasses, the radio volume, the state of the windshield (e.g. dirty with damaged wiper blades), the presence of other people in car engaged in a heated conversation, etc.

One or more embodiments are also applicable to air traffic control and boating. As an example, group cooperation measures can contribute to a traffic situation awareness display in a car or in a watercraft or aircraft.

In yet another embodiment, the group cooperation assessment, or a forecast of such assessment, may affect a traffic barrier control system. Of course, such a barrier control would be used with caution, only when there is high confidence of being a helpful safety measure.

One or more embodiments are not limited to controlling traffic lights, but are generally applicable to any system intended to achieve cooperative behavior through some kind of signaling.

Aspects of one or more embodiments can also be used to augment protective measures such as the so-called "dead man's switch" or "dead man's handle" beyond the basic notion of operation of a physical switch.

In any form of transportation (aircraft, automobiles, etc.) that has an automatic guidance and operation capability (such as an autopilot), one or more embodiments can be used to preemptively engage such capabilities. In the kinds of situation described above, an automatic system could take whatever action is necessary to avert an accident.

Note that one or more embodiments are applicable to group behavior; however, embodiments based upon monitoring the cognitive state of an individual to determine cooperation with unobserved other individuals can also be implemented.

Indeed, one or more embodiments are broadly applicable in any context in which cooperative behavior is required of a number of individuals in order to avoid an undesirable result of some kind (warehouse operations, manufacturing, etc.).

One or more embodiments thus provide a method for automatically estimating a cooperation index based on a measure of group members' foci of attention, the dynamically updated interaction graph between group members, and a set of physiological measures of group participants. In some instances, the cooperation index is further used to predict a group outcome based on an analysis of real-time and historical data. In some such cases, an alert is sent to group members warning of an imminent negative outcome due to a low cooperation index, using appropriate communication channels and protocols to decentralized and/or centralized systems; the alert may be used to trigger appropriate action.

In some cases, one or more embodiments can be adapted to augment a traffic alert and collision avoidance system which includes a traffic situation awareness display in a vehicle, wherein the vehicle is represented by a center symbol, and has other traffic entities represented by position symbols that indicate by shape the horizontal heading of a vehicle, having the shape of the represented vehicle and varying size to represent level of traffic threat or closeness in altitude differential. Symbols that indicate altitude and trend of altitude change and the same or other symbols in shape and color redundantly indicate the level of traffic threat.

In some cases, one or more embodiments can be adapted to augment a traffic barrier control system with a housing; an elongated movable barrier arm; a motor for providing an output; a drive shaft coupled to the barrier arm; a gear mechanism for operatively linking the motor and the drive shaft for moving the barrier arm between an open and a closed position; wherein the motor, the drive shaft, and the gear mechanism are attached to a platform and mechanically integrated into a modular control unit; and the modular control unit is detachably disposed in the housing to move the barrier arm between the open and closed positions.

One or more embodiments advantageously provide a method for measuring group cooperation in several applications, which makes a prediction of group cooperation. The prediction can include, for example, the productivity of the group, the synchronization, the decisiveness, or even the possibility of negative consequences. Furthermore, in consequence of the prediction, the system can provide suggestions as to group partitions or merging.

One or more embodiments analyze cooperation in a transportation network of autonomous entities to warn of impending network dysfunction and danger.

One or more embodiments aim to forecast collaboration in a transportation network in order to warn and avert danger.

One or more embodiments deal with monitoring group dynamics, focus of attention, and additional group measures to predict dysfunction in a transportation network of autonomous entities. This then triggers a warning and ameliorating action.

One or more embodiments are not experimental in nature, but rather measure group cooperation and dynamics in order to provide alerts or take an ameliorating action. Dynamics, such as those evoked by emotions, are useful in modeling autonomous entities in a transportation network.

Given the discussion thus far, and referring again to FIG. 3, it will be appreciated that, in general terms, an exemplary method, according to one aspect of the invention, includes the step of obtaining data 304 specifying a measure of a data set (e.g., number of bytes, number of columns, number of derived decision points, etc.) to be analyzed by human experts, and an allotted time for analysis completion. A further step 306 includes, based on the measure of the data set and the allotted time, creating an analysis completion schedule for a primary meeting of the human experts, whose aim is to analyze the data set. Note that in one or more embodiments, the schedule is not proscriptive, it is predictive. The constraints are provided to the system separately by humans who have reached consensus on when something needs to be done.

A further step 308 includes determining whether the primary meeting is adhering to the analysis completion schedule and/or can be speeded up; while a still further step 310 includes evaluating the primary meeting to create rate estimates for hypothetical meeting partitions. In one or more embodiments, step 310 is carried out continuously, even if no deviation from schedule is noted, to identify potential improvement.

A still further step 314 (reached by Y branch of block 308) includes, responsive to the monitoring indicating that the primary meeting is not adhering to the analysis completion schedule (e.g., meeting adherence to completion schedule falls below a threshold) and/or can be speeded up, simulating the meeting partitions until a partitioning scheme is determined that can restore the meeting to the completion schedule and/or speed up the primary meeting. One or more embodiments use simple ranking of the hypotheticals.

An even further optional step 318 includes partitioning the primary meeting into a plurality of actual meeting partitions according to the partitioning scheme. This step may be done by humans based on a machine-generated report or can be facilitated by a machine (machine may schedule another meeting room e.g.).

Figure 5:
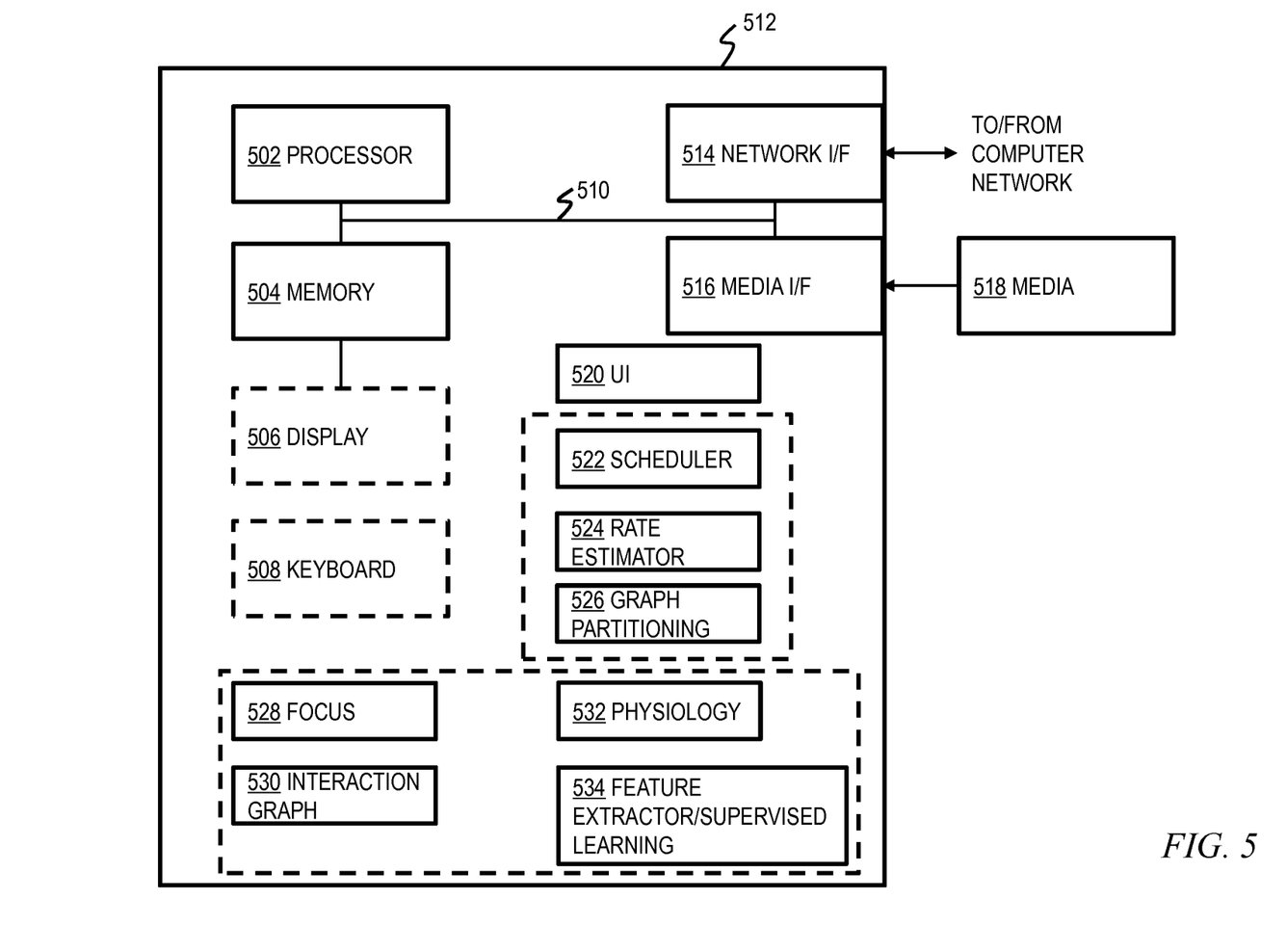
FIG. 5 depicts a computer system that may be useful in implementing one or more aspects and/or elements of the invention.

The step of obtaining the data 304 can be carried out with a suitable user interface such as a graphical user interface (GUI) or the like. For example, a server such as 512 serves out html code to a browser of a user computer, also represented by 512, to create the GUI.

The step 306 can be carried out with a scheduler module and can include pre-evaluation of portions of the data set which have been identified as being separate in the run-up to the meeting, by a human or by metadata that describe where the data came from—e.g., number of rows, number of columns, text labels of rows and columns, other types of text that have been associated with the data such as human-readable descriptions—that analysis, performed by a machine learning/text analysis topic analysis program as well as preliminary statistical measures of the data's complexity can provide certain preliminary evaluations of the data. These evaluations are noted as metadata as well and are used specifically by an application programming interface (API) in the schedule construction component to map data sets and their subsets to various cognitive skill sets, analytics, expertise, and that mapping can be hard-coded into the API or can be learned based on the effectiveness of the scheduler in achieving a user-specified outcome such as "we need a decision by Thursday."

The scheduler may be very good from the beginning, or may miss. If it misses, the mapping from the pre-analysis or pre-characterization of the data sets according to these measures, and/or the mapping to the cognitive types or cognitive expertise individuals bring to the meeting may be adjusted using machine learning as described above. That becomes the label, and it is desired to reduce the error in the outcome (i.e., how badly did we miss the target of "Thursday"). That scheduling then can proceed, having been handed the mapping, based on an estimator which determines, given the level of cognitive skill/type available in the meeting, what is the likelihood of completing analysis of a particular portion of a dataset, given its preliminarily determined characterization, automatically performed. Therefore, there can be time allotted to different tasks automatically, where the task breakdown is preliminarily determined by the first evaluation of the data.

In one or more embodiments, the system assigns time to the tasks with a "conveyor belt" model, where data is deposited on one end of the conveyor belt and the cognitive types/expertise consume the complexity that has been measured about the data in the form of transforming it into analyzed data at a particular rate. That rate determines the expected completion time of a particular task. It becomes a model of total complexity of the data in relation to the specific category of analysis or tasks, the expertise the group brings to that, the expected interactions required to proceed—all of that creates a rate, and time is estimated by the total complexity and the rate of reducing the complexity.

Regarding step 308, the same can also be carried out with the scheduler module; the schedule itself is a machine artifact which can be used to parameterize a model of the meeting and its progress in real time. It can generate milestones, which it uses to further fit the model to the meeting as it plays out in the real world. At the machine-determined milestones, there can be a query or questionnaire sent to the meeting participants about its progress, which can be formulated in such a way that is minimally disruptive—e.g., just get minimum information from meeting to determine whether milestone has been met.

Regarding step 310, the same can be carried out with a rate estimator module. The rates of reduction of data complexity to outcomes are determined by the expertise in the meeting and are also influenced by an estimation of interactions between meeting participants and how that impacts the efficiency of the preliminarily-determined rate. What this means is that the graph of interactions that are possible that impact the rate should be analyzed. It can be viewed as a graph partitioning problem with all of the expected interactions between individuals where each edge in the graph impacts the rate, and can be cut and the rate can be changed in the model which is providing a forward estimate rather than a schedule. This becomes a hypothetical estimate for that particular partitioning—if "Fred" cannot talk to "Judy," determine how the meeting will run. The estimate is represented as a graph and a graph partitioning. One or more embodiments cut the graph in many different ways to estimate a hypothetical model of the meeting's future progress in reducing complexity to outcomes. In essence, speculatively cut links and separate nodes out to see what happens. The expression of the rate of reduction of data complexity to outcomes or to reports can be highly dependent upon the graph in ways that are non-linear; e.g., an iterative calculation over the graph given the new topology that gives rise to the new rate. One or more embodiments make the computation in parallel since it may take time to compute all the different partitions/iterations of the graph in order to provide the various estimates which are ranked in one or more embodiments in connection with use in step 314. Calculation in parallel is thus preferred, as seen at 310; however, some embodiments need not do the calculations in parallel.

Step 314 can be carried out with a graph partitioning module.

Note that in some cases, the human experts employ computing resources in the analysis of the data set, and scarcity of the computing resources includes at least one factor causing the primary meeting to deviate from the analysis completion schedule. In such cases, a dynamic partitioning of the data set between the actual meeting partitions and additional compute resources can be included in the partitioning scheme, and the partitioning of the primary meeting into the plurality of actual meeting partitions can be optimized to minimize the cost in compute resources required, as per optional step 316. Furthermore in this regard, different individuals have different skills in different analytic techniques which they are more likely to apply. Different analytic techniques have different compute requirements. These requirements are advantageously taken into consideration in one or more embodiments, so as to partition groups towards efficient outcomes. Consider that two machine learning experts may have the same estimated rate/contribution to the partition but one likes to use method A and the other likes to use method B; method A takes 10 times the compute resources of method B.

As noted, in the obtaining step, the measure of the data set could include, for example, a number of bytes in the data set, a number of columns in the data set, a number of derived decision points in the data set, or the like.

As also noted, in some cases, the monitoring of the primary meeting for the adherence to the analysis completion schedule includes determining whether monitored completion of the primary meeting exceeds the analysis completion schedule by a threshold; or stated alternatively, whether meeting adherence to the completion schedule falls below a threshold.

Furthermore, given the discussion thus far, and referring again to FIG. 4, it will be appreciated that, in general terms, another exemplary method, according to another aspect of the invention, includes the step 404 of dynamically updating a model of focus of attention of each member of a group of individuals engaged in an activity requiring cooperation (e.g., with a focus of attention monitoring module). Examples of such activities include running a meeting or a transportation system with various cars, trains, boats, airplanes. Furthermore, as used herein, including the claims, "an activity" should be broadly understood to include related activities, e.g., driving a car and engineering a train approaching a grade crossing are viewed as a single activity. Another example of a single activity, in this sense, includes cooperative ventures in a group, e.g., a team including electronic engineers, thermal engineers, structural engineers, and other experts cooperates to design and build a piece of electronic equipment that has to function in a certain environment.

A further step 406 includes generating an interaction graph showing, over time, which members (e.g., people or vehicles) have interacted and over what linkages the interactions have occurred (e.g., with an interaction graph module), while an even further step 408 includes measuring at least one physiological parameter associated with at least one (and optionally, each) of the members (e.g., with a physiology module, interfacing with at least one physical sensor). Such parameters can include, for example, pupil dilation, skin conductance, and vocalization rate. Yet a further step 410 includes determining a cooperation index based on the model of focus of attention, the interaction graph, and the at least one physiological parameter of at least one (and optionally, each) of the members. This step can be carried out with a feature extractor and supervised learning module.

An additional step 412 includes comparing the determined value of total cooperation index to historical data to predict a given outcome for the group of individuals engaged in the activity. In a non-limiting example, a regression of the historical data is used for comparison purposes. Step 412 can be carried out with logic and/or the feature extractor and supervised learning module. Another step 416, reached by the Y branch of decision block 414, includes, if the predicted group outcome has significant negative consequences (e.g., collision, failure of meeting to achieve goal), alerting the group of individuals engaged in the activity requiring cooperation that the cooperation must improve to reduce likelihood of the predicted group outcome with the significant negative consequences. This could include, for example, communicating the "exceedance" over appropriate redundant robust communications (wired, wireless as above) channels using appropriate protocols, over meshed (decentralized) or centralized networks for action i.e. alerts, overrides, and the like. Step 416 can be carried out with logic, a suitable UI, and/or the feature extractor and supervised learning module.

In some instances, in the step of dynamically updating the model of the focus of attention, the activity includes running a meeting; in the step of generating the interaction graph, the members include human participants in the meeting; and in the alerting step, the significant negative consequences include failure of the meeting to achieve a desired goal.

In some such instances, in the step of measuring at least one physiological parameter associated with each of the members, the at least one physiological parameter includes at least one of pupil dilation, skin conductance, and vocalization rate for the human participants in the meeting.

In other cases, in the step of dynamically updating the model of the focus of attention, the activity includes running a transportation system with a plurality of vehicles; in the step of generating the interaction graph, the members include the vehicles, the vehicles having human operators; and in the alerting step, the significant negative consequences include a collision involving at least one of the vehicles.

In some such cases, in the step of measuring at least one physiological parameter associated with each of the members, the at least one physiological parameter includes at least one of pupil dilation, skin conductance, and vocalization rate for the human operators of the vehicles.

In some embodiments, the alerting further includes modifying behavior of at least one traffic control signal; for example, changing a traffic light from green to red, or causing it to remain red longer.

In some embodiments, the alerting further includes taking at least partially automated control over at least one of the vehicles; for example, engaging vessel or aircraft autopilot, activating a virtual "dead-man's switch" to stop a train, etc.

In some embodiments, the alerting further includes causing at least one of the human operators to experience a tactile sensation in at least one of a hand and a foot control; for example, causing a steering wheel or foot pedal to vibrate mechanically or tingle electrically.

Alerting can be, for example, via a wired network and/or a wireless network. In some cases, a social network can be used to initiate alerts.

One or more embodiments of the invention, or elements thereof, can be implemented, at least in part, in the form of an apparatus including a memory and at least one processor that is coupled to the memory and operative to perform exemplary method steps.

One or more embodiments can make use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

It should be noted that any of the methods described herein can include an additional step of providing a system comprising distinct software modules embodied on a computer readable storage medium (e.g., persistent storage portion of memory 504); the modules can include, for example, any or all of the elements depicted in the block diagrams or other figures and/or described herein. For example, the modules could include a user interface module 520, a scheduler module 522, a rate estimator module 524, and a graph partitioning module 526. In addition or alternatively, the modules could include a focus of attention monitoring module 528, an interaction graph module 530, a physiology module 532 interfacing with at least one physical sensor (e.g., via interface 514); and a feature extractor and supervised learning module 534. The method steps can then be carried out using the distinct software modules and/or sub-modules of the system, as described above, executing on one or more hardware processors 502. Further, a computer program product can include a computer-readable storage medium with code adapted to be implemented to carry out one or more method steps described herein, including the provision of the system with the distinct software modules. Regarding the method of FIG. 4, consider modules for focus of attention, interaction graphing, a feature extractor for inputs into CI, supervised learning (learn function of features), and learning function of CI for applying threshold of negative consequences. Regarding the method of FIG. 3, consider a scheduler with sub-components for preliminary analysis of data to assign metadata measures e.g. topic analysis, text metadata, formulaic aspects of structure of data such as number of rows and columns, preliminary statistics on the data that describe its complexity (a complexity-estimating component). Consider further a rate-estimating component preliminarily based on mapping the different categories of complexity to different cognitive types/cognitive expertise of meeting participants; interaction estimates and how they influence rates; a graph partitioner which can undertake a forward model given different partitions of how those rates might change; and optimizer which chooses the best partition and facilitates partition by scheduling another meeting room and/or providing a report to the participants.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for automatically measuring group cooperation and for modifying a group outcome in response to the measurement of group cooperation, the method comprising:

dynamically updating a central model of focus of attention of each member of a group of vehicles that are engaged in driving and communicating data about focus of attention within a communication network;

generating an interaction graph that tracks, over time, which of the members have interacted with each other and over what linkages of the interaction graph the interactions have occurred;

determining a cooperation index of the group based on the central model of focus of attention and the interaction graph, wherein the cooperation index is a global measure of group cooperativeness;

comparing said cooperation index to historical data to predict the group outcome for the group of vehicles;

determining that the predicted group outcome has significant negative consequences; and alerting, via the communication network, the group of vehicles engaged in the activity requiring cooperation, upon determining that the predicted group outcome has significant negative consequences, wherein:

the alerting comprises communicating an exceedance over a communications channel of the communication network to the group of vehicles and to a traffic alert and control system connected to the communication network, wherein the exceedance is configured to increase the cooperation index by causing a change in a timing of at least one traffic signal of the traffic alert and control system affecting the vehicles and by preemptively engaging automatic guidance and operation capabilities of at least one of the vehicles.

2. The method of claim 1, wherein the comparing of the cooperation index to historical data comprises comparing a determined value of total cooperation index to a regression of the historical data.

3. The method of claim 1, wherein:

the step of dynamically updating the model of focus of attention is carried out with a focus of attention monitoring module, embodied on a non-transitory computer readable medium, executing on at least one hardware processor;

the step of generating said interaction is carried out with an interaction graph module, embodied on the non-transitory computer readable medium, executing on the at least one hardware processor;

the step of determining the cooperation index is carried out with a feature extractor and supervised learning module, embodied on the non-transitory computer readable medium, executing on the at least one hardware processor;

the step of comparing the determined value of total cooperation index to historical data to predict the group outcome for the group of vehicles engaged in the activity is carried out with the feature extractor and supervised learning module, embodied on the non-transitory computer readable medium, executing on the at least one hardware processor; and the step of alerting the group of vehicles is carried out with the feature extractor and supervised learning module, embodied on the non-transitory computer readable medium, executing on the at least one hardware processor.

4. The method of claim 1, wherein the alerting further comprises causing at least one of a mechanical vibration or an electrical stimulus in a hand or foot control of at least one vehicle of the group of vehicles.

* * * * *